United States Patent [19]
Clostermeyer et al.

[11] Patent Number: 5,826,418
[45] Date of Patent: Oct. 27, 1998

[54] ROUND BALER FOR HARVESTED PRODUCT

[75] Inventors: Gerhard Clostermeyer, Gütersloh; Heinz Niemerg; Dirk Esken, both of Harsewinkel, all of Germany

[73] Assignee: CLAAS KGaA, Harsewinkel, Germany

[21] Appl. No.: 766,941

[22] Filed: Dec. 16, 1996

[30] Foreign Application Priority Data

Dec. 22, 1995 [DE] Germany .................. 195 48 271.9

[51] Int. Cl.⁶ ................................ A01D 39/00
[52] U.S. Cl. .................. 56/341; 100/88; 192/53.51
[58] Field of Search ............... 56/341, 343; 100/88; 192/53.51, 69.61, 69.62, 56 R, 55

[56] References Cited

U.S. PATENT DOCUMENTS

| | | | |
|---|---|---|---|
| 932,155 | 8/1909 | Mather | 192/53.51 |
| 4,208,862 | 6/1980 | Waldrop et al. | 56/341 |
| 5,450,704 | 9/1995 | Clostermeyer | 56/341 X |

*Primary Examiner*—Randolph A. Reese
*Assistant Examiner*—Greg Binda
*Attorney, Agent, or Firm*—Michael J. Striker

[57] ABSTRACT

A round baler for harvested product comprises a housing, a pressure chamber with walls limiting the pressure chamber at an end side and with driven transporting elements limiting the pressure chamber at a peripheral side and forming a harvested product inlet opening, a drivable transporting rotor arranged near the inlet opening for closing the inlet opening, and a drive provided for driving the transporting elements and the transporting rotor and formed so that during the formation of a bale the drive drives the transporting roller in a form-locking manner and during a time of ejection of the bale the drive drives the transporting rotor frictionally.

19 Claims, 2 Drawing Sheets

ROUND BALER FOR HARVESTED PRODUCT

BACKGROUND OF THE INVENTION

The present invention relates to a round baler for harvested product.

More particularly, it relates to a round baler which has a housing swingable by a cylinder-piston unit for ejection of bales, and a pressure chamber limited at an end side by walls and at a peripheral side by driven transporting elements, for example endless belts, to form a harvested product inlet opening, with a driveable transporting rotor for closing the inlet opening.

Round balers are known in the practice, in which in the region of the harvested product inlet a transporting rotor is arranged and forms a part of pressure limiting means. This has the advantage that the harvested product transported in the pressure chamber is supplied in a rotary direction of the pressed bale to be formed in the pressure chamber, and thereby a bale formation or a bale rotation is improved, in particular in the starting phase. The bale pressure chamber is limited substantially over the periphery by endless bands outside of the transporting rotor. The endless bands deviate with increasing bale diameter, and thereby the pressure chamber is continuously increased. After ending the bale forming process, the finished bales are ejected rearwardly by flipping of the rear housing part rearwardly. During this ejection phase, the drive for the bands which forms simultaneously the drive for the transporting rotor is switched off, for avoiding possible damages to the bale peripheral surface by the rotating rotor. It is advantageous when the bale also during the ejection phase the bale is retained by the band in rotation as long as possible, to improve the ejection of the bale. When however the bale is released from the bands, the bands can no longer support the bale in its rotary movement so that it is substantially reduced. During this phase the bale is located with a part of its weight on the transporting rotor, since it is arranged in the lower part of the bale chamber. Since the rotor drive is coupled with the drive of the bands, the peripheral speed of the rotor is substantially higher than the peripheral speed of the bale which is almost immovable in this phase. Therefore, there is the disadvantage that the outer peripheral surface of the bale is substantially damaged by the rotor. In order to avoid this disadvantage it was proposed to connect the drive of the transporting rotor with the drive of the bands with interposition of a coupling. However, this approach did not provide a satisfactory result. The use of a form-lockingly operating coupling has the disadvantage that it can transmit very high forces, but simultaneously is subjected to little structural space. This has the disadvantage that it is switched-on by jerks. As a result, extremely high torque peaks are produced, when it is necessary to consider that a stationary transporting rotor, for example by a cam coupling, must be accelerated to the speed of the continuously rotating transporting bands. Another alternative was to use a friction coupling which is switchable substantially softer. The use of such a coupling however is not acceptable since in order to transfer the required torque, it must be very big, which is connected with exceptionally high costs.

SUMMARY OF THE INVENTION

Accordingly, it is an object of the present invention to provide a round baler of the above mention general type, which avoids the disadvantages of the prior art.

More particularly, it is an object of the present invention to provide a round baler in which the drive for the transporting bands and the transporting rotor can be adjusted in an optimal way to the corresponding conditions during the bale formation and during a bale ejection.

In keeping with these objects and with others which will become apparent hereinafter, one feature of the present invention resides, briefly stated, in a round baler in which both the transporting elements and the transporting rotor are continuously driven during the bale formation and during the bale ejection, and the drive for the transporting rotor during the bale formation is performed in a substantially form-locking manner and during the time of the bale ejection is performed in a friction-locking manner.

When the round baler is designed in accordance with the present invention, there is the advantage that during the bale ejection the bands remain driven, whereby on the one hand they are selfcleaning and on the other hand they support the rotor movement of the bale in the ejection phase.

On the other hand, the transporting rotor which in this phase is driven only frictionally has the advantage that due to the relatively weak frictional connection the rotor is braked for the time during which the bale rests on it. At the same moment, since the bale is released from the rotor, the frictional force again fully engages, so that the rotor is driven with the same speed as the bands. As a result, no relative movement between the driven parts for the rotor and for the band occurs, so that the form-locking connection can be immediately produced without torque peaks.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
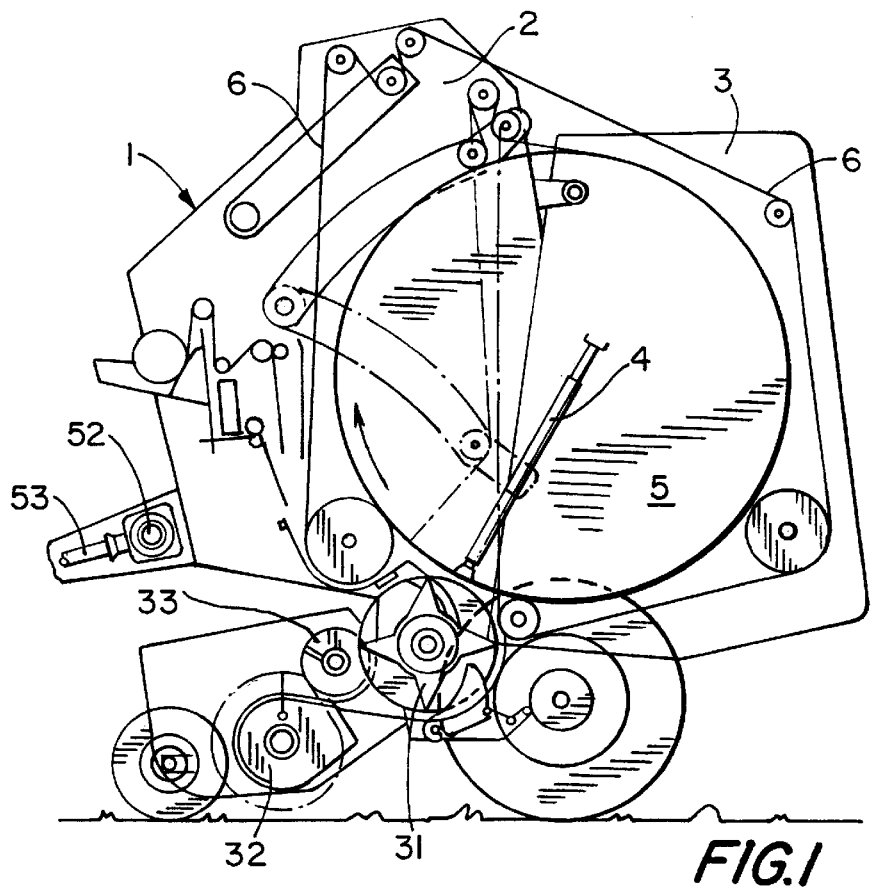
FIG. 1 is a side view of a round baler in accordance with the present invention.

A baler in accordance with the present invention is identified as a whole with reference numeral 1. It has a stationary and a swingable housing part 2 and 3 correspondingly. The swinging movement is performed by a hydraulic cylinder-piston unit 4. The baler 1 has a pressure chamber 5 which is limited at a peripheral side by endless bands 6 deviating against the pressure of a bale which grows during a winding process.

The bands 6 are continuously driven both during the bale formation and also during the ejection of a finished bale. For this purpose a chain wheel 9 is fixedly arranged on a projecting shaft end 7 of a deviating roller 8 for the bands 6. The chain wheel 9 is connected through a chain 10 with a toothed wheel 11. The toothed wheel is formed of one-piece with a sleeve-shaped projection 12 having inner teeth 13. Outer teeth 14 at the end of a shaft 15 engage in the inner teeth 13, and the toothed wheel 11 with the projection 12 is fitted on the shaft 15. The projection 12 with the toothed wheel 11 is connected to the shaft 15 by a screw 17 which is partially screwed into the shaft end 16, through a pressure plate 18 and a spring 19. The end of the toothed wheel 11 is provided with a friction coating 20 and supported through the friction coating against the end side of a flange 21 which is connected with a toothed wheel 23 through a sleeve 22. The central opening of the sleeve 22 receives a sliding bushing 24 for supporting the sleeve 22 with the flange 21 and the toothed wheel 23 rotatably on the shaft 15. The sleeve 22 is supported through a pressure bearing 25 on an eccentric clamping disk 26 of the bearing 28 through a disc 27 and abuts against a collar 29 of the shaft 15. In this manner, the frictional connection is produced between the toothed wheel 11 which is form-lockingly connected to the shaft 15, and the toothed wheel 23.

Figure 2:
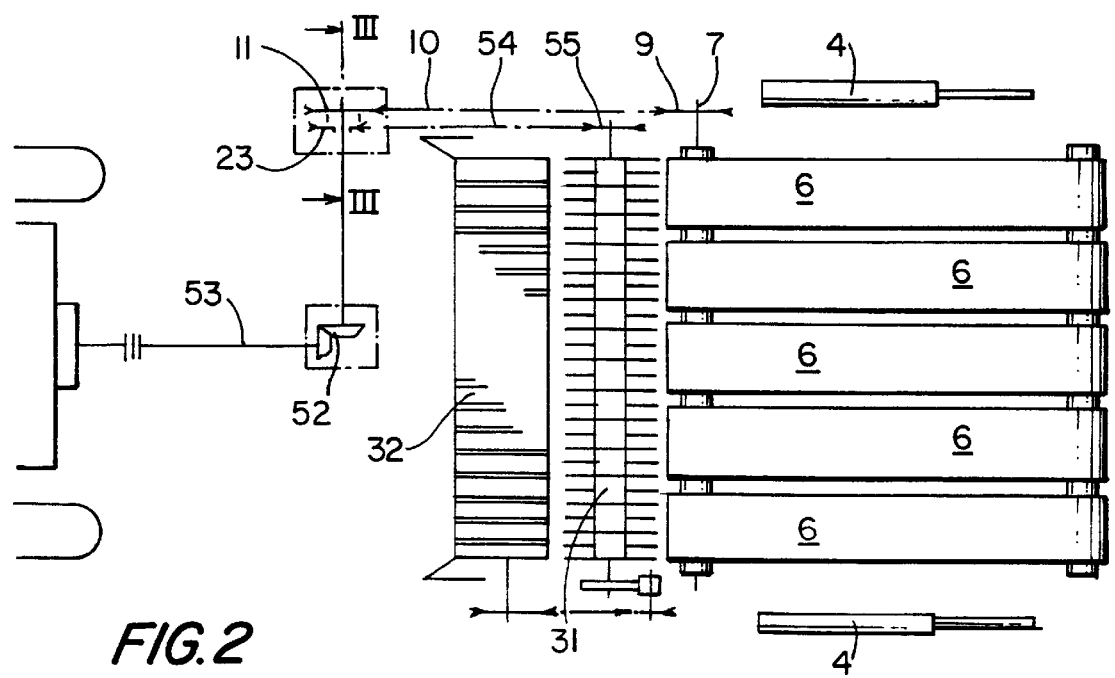
FIG. 2 is a view showing transporting elements of the baler of FIG. 1 on a plane view.

The toothed wheel 23 is connected through a chain 54 shown in FIG. 2 with a chain wheel 55 for driving a transporting rotor 31 arranged in the region of an inlet opening. The transporting rotor 31 presses the harvested product which is transported from the pick-up 32 and the screw 33, into the baler pressure chamber 5 and guides the rotation of the harvested product in the baler pressure chamber 5 at the beginning of a bale formation. For providing the reliable transporting function of the harvested product, the frictional connection in the coupling 34 between the toothed wheel 11 and the toothed wheel 23 is however insufficient. For this reason, additionally to the frictional connection, a form-locking connection between the wheels 11 and 23 can be produced. For this purpose the flange 21 of the toothed wheel 23 is provided at its outer periphery with three blocking projections 35 which engage each a corresponding pin 36 during the form-locking connection, and the pin 36 is axially displaceably supported in the throughgoing openings 37 of the toothed wheel 11. The projections 35 and the openings 37 form therefore interengageable projection and recess means.

At the end facing away from the flange 21, the pin 36 is screwed with a rotatable collar 38 of a cup 39, whose cover 40 is connected fixedly with a cylinder 41. The hydraulic cylinder 41 is connected through a known rotary connector 43 with a pressure medium conduit 42. The rotatable collar 38 is pressed in direction of the chain wheel 11 by several pressure springs 44 which are distributed on the periphery. Each spring 44 is supported at one end against the rotatable collar 38 and at the other end against the head 45 of a screw 46 which is screwed in the toothed wheel 11. The screw 46 extends with a gap through the rotatable collar 38. The collar, however does not come to abutment against the toothed wheel 11 since the piston 47 of the cylinder 41 abuts against the head of the screw 17 with interposition of a plate 48. The plate 48 carries upwardly projecting pins 49 which extend with a gap through the cover 40 of the cup 39. Disks 50 are fixedly connected with the free ends of the pin 49 and pressure springs 51 abut at their end against the disks. The pressure springs 51 abut with their other ends against the cover 40, so that the piston 47 is pressed in the cylinder 41 when the cylinder chamber has no pressure.

Figure 3:
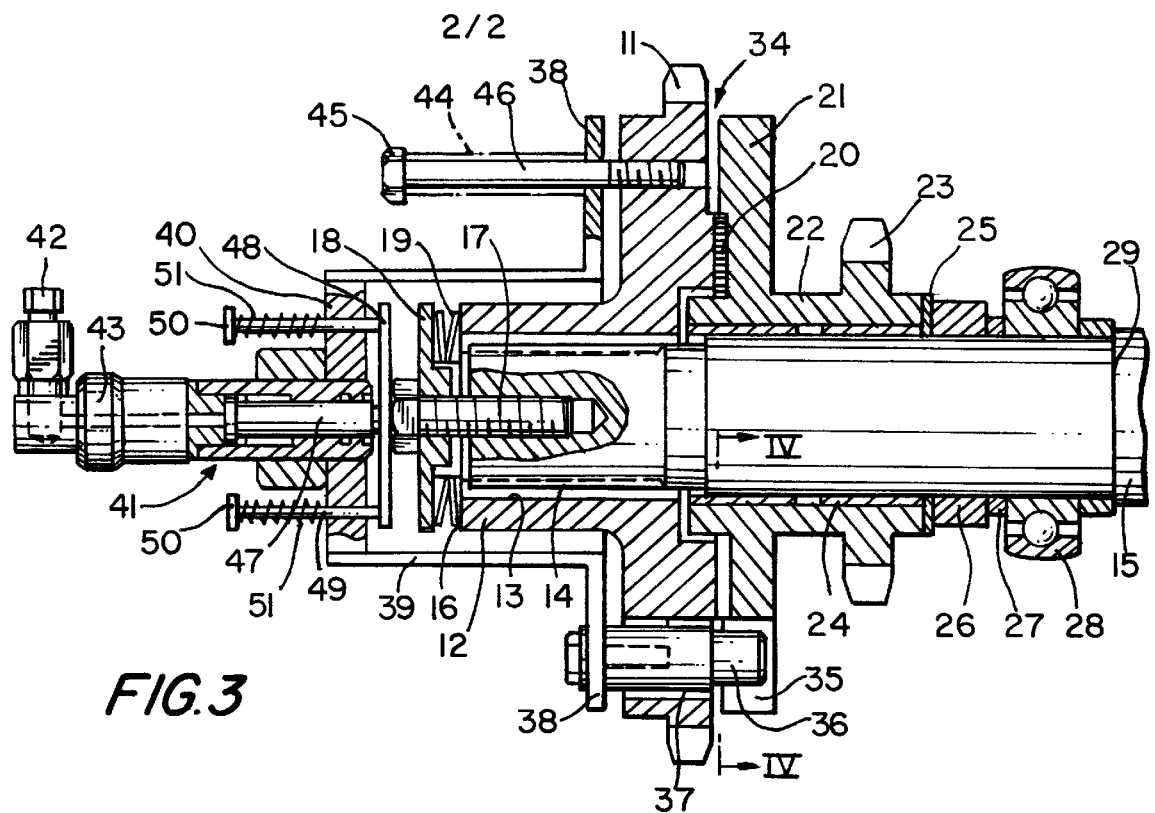
FIG. 3 is a view showing a coupling unit identified with broken lines in FIG. 1, in a detailed illustration in the section taken along the line III—III in FIG. 2.
Figure 4:
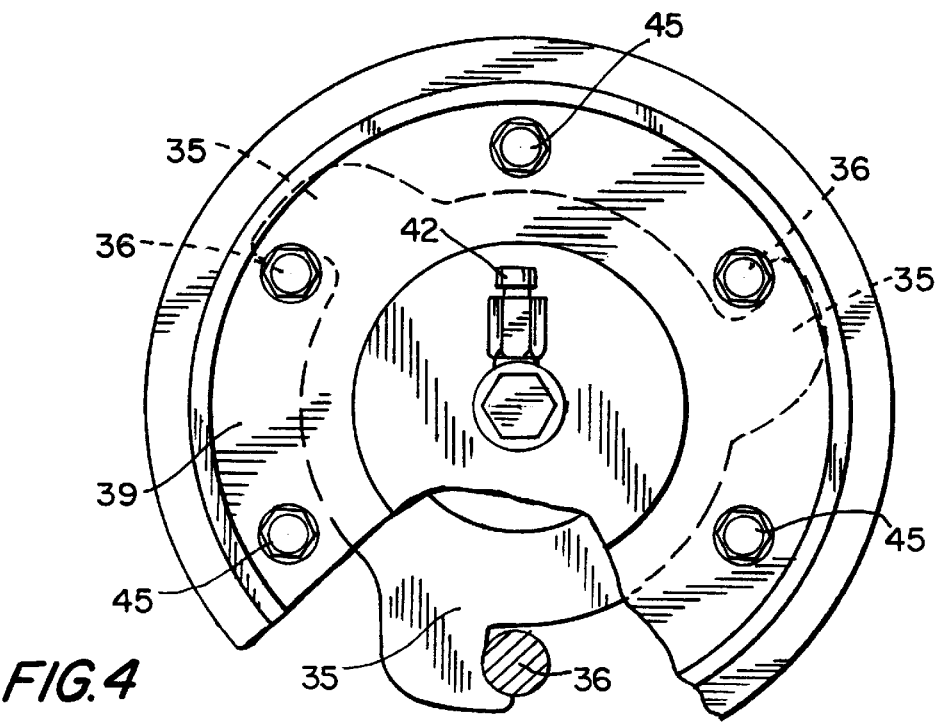
FIG. 4 is a side view with a partial section taken along the line IV—IV, in FIG. 3.

In the position of the coupling 34 shown in FIGS. 3 and 4, the toothed wheel 23 for driving the transporting rotor 31 is form-lockingly connected with the shaft 15, to provide secure transportation of the harvested product into the bale chamber 5 by the transporting rotor 31. The shaft 15 is driven through an angular transmission 52 and a shaft 53 coupled with the tractor. When a finally wound bale must be ejected, the hydraulic cylinder-piston unit 4 is loaded with pressure to raise the housing part 3. In this moment oil is pumped through the conduit 42 into the cylinder 41, so that the piston 47 is extended and therefore lifts the cup 39. During this movement the pins 36 are pulled outwardly against the force of the springs 44 upwardly in FIG. 3 from the region of the blocking projections 35. As a result, the flange 21 and thereby also the toothed wheel 23 is connected only frictionally with the drive shaft 15 through the toothed wheel 11. Thereby, the transporting rotor 31 is driven and the frictional connection is adjusted so low that it no longer drives the harvested product bale, or in other words can set it in rotation. Moreover, the bale whose rotational speed during the injection continuously decreases, can stop the transporting rotor with overcoming the frictional connection, so that the bale can not be damaged on its periphery by the transporting rotor. When however the bale is ejected the transporting rotor assumes its high rotary speed provided by the shaft 15 actuated solely by the frictional connection between the shaft 15 and the toothed wheel 23. When now the housing part 3 is closed, the conduit 42 at the coupling 34 is no longer under pressure, and the oil can flow from the cylinder 41 being supported by the springs 51 which constantly press the piston 47 into the cylinder 41. Therefore the cup 39 is lowered by the force of the springs 44, together with the pins 36 screwed with its collar 38. The springs 44 move either in the space between the projection 35 or support in unfavorable condition on the projections. When a higher torque is required for driving the transporting rotor 31, the pins 36 displace by a low relative movement between the toothed wheels 11 and 23 relative to one another, so that they come to abutment against the projection 35. Since however because of the continuously producing frictional connection in the coupling, immediately after the ejection of a bale a synchronism between the bands 16 and the transporting rotor 31 is produced, the starting of the form-locking is performed very soft and without significant torque peaks.

It will be understood that each of the elements described above, or two or more together, may also find a useful application in other types of constructions differing from the types described above.

While the invention has been illustrated and described as embodied in a round baler for harvested product, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

It is claimed:

1. A round baler for harvested product, comprising a housing which is swingable for ejection of bales; means forming a pressure chamber said means including walls limiting said pressure chamber at an end side and driven transporting elements limiting said pressure chamber at a peripheral side so as to form a harvested product inlet opening; a drivable transporting rotor arranged near said inlet opening for closing said inlet opening; driving means for driving said transporting elements and said transporting rotor so that both during a formation of a bale and during an ejection of a bale said transporting elements and said transporting rotor are continuously driven, said driving means being formed so that both during the formation of a bale and during a time of the ejection of a bale said driving means drive said transporting elements in a form locking manner, but during the formation of a bale said driving means drive said transporting rotor in a form-locking manner and during a time of the ejection of the bale said driving means drive said transporting rotor frictionally and due to a relatively week frictional connection said transporting rotor is braked for a time during which the bale rests on said rotor and when the bale is released from said transporting rotor a frictional force again fully engages.

2. A round baler as defined in claim 1; and further comprising a cylinder-piston unit arranged for swinging said housing so as to provide the ejection of a bale.

3. A round baler as defined in claim 1, wherein said transporting elements are formed as endless belts.

4. A round baler as defined in claim 1, wherein said driving means is provided for driving said transporting rotor and includes a coupling which is switchable between a form-locking connection and a frictional connection.

5. A round baler as defined in claim 4, wherein said housing has a swingable housing part, said coupling being switchable in dependence on a position of said swingable housing part.

6. A round baler as defined in claim 4, wherein said coupling has a variable frictional connection.

7. A round baler as defined in claim 1, wherein said driving means include a drive for said transporting rotor and a drive for said transporting elements, said drive for said transporting rotor being driven from said drive for said transporting elements.

8. A round baler as defined in claim 1, wherein said drive means include a shaft, a projection arranged on said shaft nonrotatably and axially displaceably, a toothed wheel for driving said transporting rotor and arranged so that said toothed wheel is freely rotatably supported on said shaft and said projection frictionally abuts against said toothed wheel, said projection and said toothed wheel being provided with interengageable driving formations providing a form-locking connection between said projection and said toothed wheel.

9. A round baler as defined in claim 8, wherein said interengageable driving formations include recess formations and projection formations engaging with one another.

10. A round baler as defined in claim 8, and further comprising an axially displaceable pin through which a form-locking connection is provided by said interengageable formations between said projection and said toothed wheel.

11. A round baler as defined in claim 10, wherein said interengageable formations have interenging recess formation and projection formation; and further comprising a flange; a sleeve through which said toothed wheel is fixedly connected with said flange, said flange being provided with said projection formation which engage form-lockingly said pin, said pin being axially displaceably supported in a receiving opening of said formation.

12. A round baler as defined in claim 10, wherein said interengageable formations have recess formations and projection formations, said drive means including a drive for said transporting element and provided with a further toothed wheel, said projection being formed of one-piece with said further toothed wheel, said chain wheel having said recess formation for said pin.

13. A round baler as defined in claim 12, and further comprising a cylinder-piston unit for swinging said housing and including a cylinder; a cup having a cover mounted on said cylinder; and a circumferential collar, said pin having an end which faces away from said projection formation and is screwed on said collar, said collar being pressed by a spring force against said further toothed wheel.

14. A round baler as defined in claim 13, and further comprising a screw which is partially screwed in said further toothed wheel and extends through said collar with a gap; and a spring having one end abutting against a head of said screw end and another abutting against said collar.

15. A round baler as defined in claim 14; and further comprising a further screw which is partially screwed in said shaft, said cylinder-piston unit having a piston having an end which abuts against said head of said further screw which is partially screwed in said shaft.

16. A round baler as defined in claim 15, and further comprising a plate located between said head of said screw and said piston mounted on pins which extend through said cover of said cup with a gap upwardly and springloaded so that said plate is always pulled in direction toward said cover.

17. A round baler as defined in claim 8, and further comprising a screw which is partially screwed in an end of said shaft and having a head, and a spring having one end abutting against said head and another end abutting against said projection.

18. A round baler as defined in claim 8; and further comprising an eccentric clamping ring abutting against a bearing and connected with said shaft, said toothed wheel having an end supported on said eccentric clamping ring.

19. A round baler as defined in claim 1; and further comprising a cylinder-piston unit for swinging said housing and including a cylinder; an oil supply conduit; and means for connecting said cylinder with said oil supply conduit.

* * * * *